L. M. WHITMAN.
Horse Hay-Rakes.
No. 4,444.  Patented April 4, 1846.
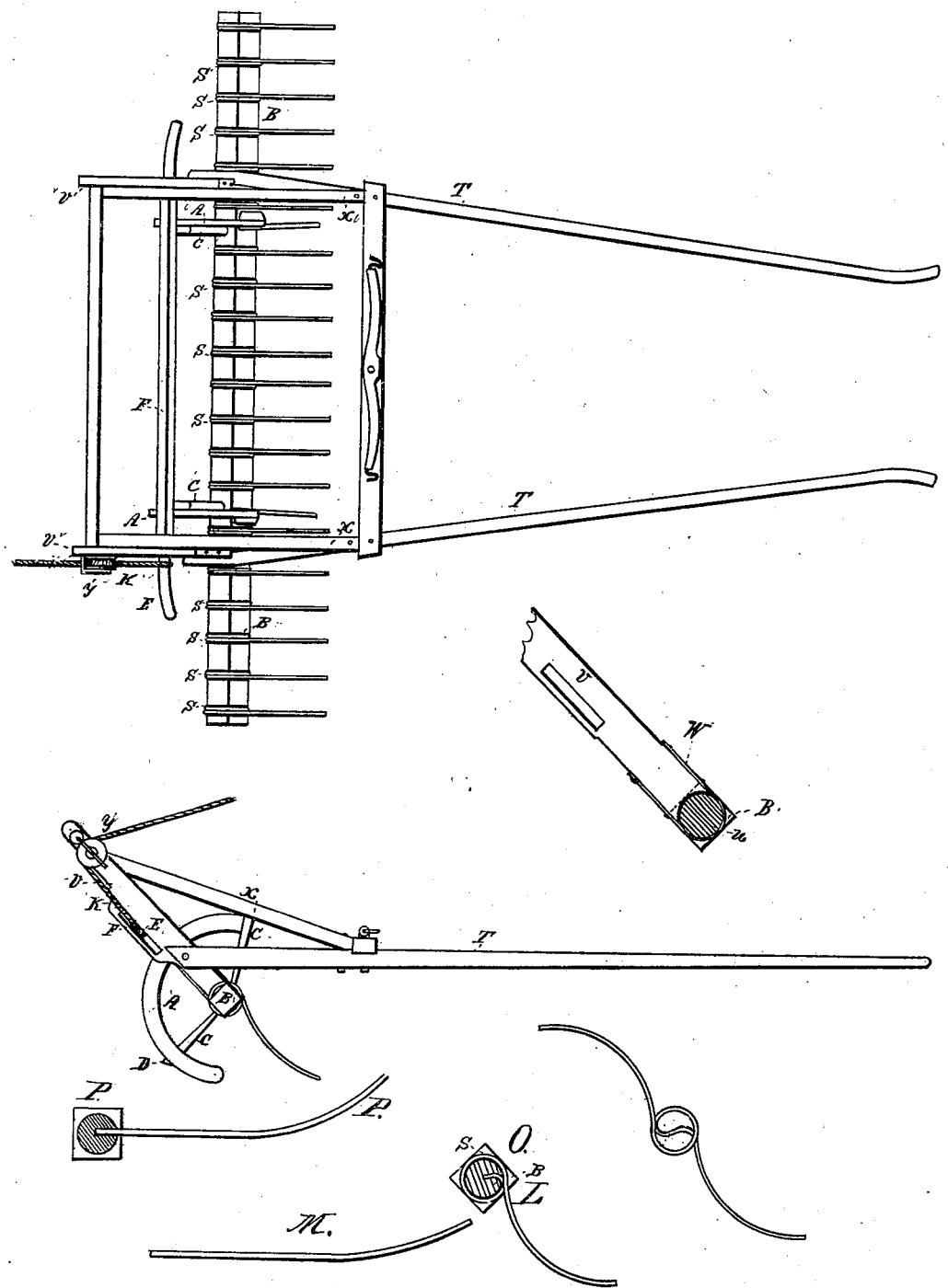

UNITED STATES PATENT OFFICE.

L. M. WHITMAN, OF PIKE, NEW YORK.

IMPROVEMENT IN SPRING-TOOTH HORSE-RAKES.

Specification forming part of Letters Patent No. 4,444, dated April 4, 1846.

*To all whom it may concern:*

Be it known that I, LORIN M. WHITMAN, of Pike, Allegany county, and State of New York, have invented a new and useful Improvement on Horse Hay-Rakes for Raking Hay and Stubble; and I do hereby declare that the following is a full, clear, and exact description of the construction and operation of the said rake, reference being had to the accompanying drawings, making part of this specification.

A A represent segments of wheels, attached to the head of the rake by spokes, and on which the rake revolves; B B, head of the rake, with grooves turned in it to receive the coil of the teeth; C C, spokes to the wheels; D D, ends to the spokes, projecting out and serving as catches against the stop-bar F; E, handle or end of the stop-bar F to raise it up from the catches and permit the rake to revolve on the segments of wheels A A. Said stop-bar falls back of itself and stops the rake in a right position for raking after it has revolved. V V, handles to the rake, with mortises in them for the stop-bar to slide in. Said handles fasten to the head of the rake by a strap of iron attached to them, passing around the head, forming a loop or place for the head to revolve in, as represented in section W. X X, braces, with one end bolted to the handles and the other to the thills T T. Therefore, as the stop-bar F is on the back side of the handles, and the catches are back of the stop-bar, and the braces from the handles to the thills, it will be seen that the power of holding the head in a position for raking rests on the thills, so that in gleaning and light raking the necessity of a person to hold the rake may be dispensed with, because a cord, K, may be fastened to the stop-bar at the handle E and extended over the pulley Y to the rider, by which he can raise the stop-bar, when necessary, and permit the rake to revolve, and thus tend the rake as he rides the horse.

M represents the wire for a tooth, one end being bent, ready to be fastened to the head of the rake, sections O and P P.

P P represents a wire tooth driven or fastened into the head of the rake, ready to be wound or coiled around it.

L represents the form of a tooth after it has been fastened to the head of the rake and wound around it and shaped for use.

U U represent grooves in the head of the rake for the ends of handles V V, as represented at W, to be confined in; S S S, grooves formed by turning off the corners of the square head, section O, for the teeth to be coiled in.

I hereby disclaim the original invention of horse hay-rakes as heretofore constructed and used. I likewise disclaim the invention of the plan of attaching the lower ends of the handles by a strap of iron passing around the head of the rake.

What I do claim, and desire Letters Patent for, is—

1. The invention and combination of the segments of wheels with the head of the rake, and by which it revolves, in the manner substantially as set forth in the specification.

2. The combination of the stop-bar and catches with the segments of wheels to hold the head of the rake in a right position for raking.

And I do hereby further declare that I do not intend to limit myself to the precise size or form of the segments of wheels on which the rake revolves, nor to the shape, size, or length of the head or other parts of the said rake; but I wish to vary the same, if I may think it expedient, so as to admit of the application of a set of double teeth (see section H, to the head of the rake, on the same principle on which the single tooth is applied, while I attain the same ends by means substantially the same—that is, in producing a revolving spring-tooth horse hay-rake with a stop-bar and segments of wheels to revolve on, &c., as represented in the accompanying drawings and sections.

LORIN M. WHITMAN.

Witnesses:
ABM. P. SHERRIL,
CALVIN JAKEWAY.